United States Patent [19]

Weber et al.

[11] Patent Number: 4,978,747
[45] Date of Patent: Dec. 18, 1990

[54] COLORANTS OBTAINED BY REACTING A $NH_2$-CONTAINING DYESTUFF WITH A DIISOCYANATE FOLLOWED BY REACTION OF THIS ADDUCT WITH A DIAMINE

[75] Inventors: Karl-Arnold Weber, Betzweiler; Hermann Henk, Cologne; Klaus Kunde, Neunkirchen; Jochen Westphal, Dusseldorf; Klaus Wunderlich, Leverkusen, all of Fed. Rep. of Germany

[73] Assignee: Bayer Aktiengesellschaft, Leverkusen, Fed. Rep. of Germany

[21] Appl. No.: 337,497

[22] Filed: Apr. 13, 1989

[30] Foreign Application Priority Data

Apr. 29, 1988 [DE] Fed. Rep. of Germany ....... 3814531

[51] Int. Cl.$^5$ ..................... C09B 43/00; C09B 43/55; C09B 69/10; C07D 11/02
[52] U.S. Cl. .................................. 534/735; 534/573; 534/588; 534/591; 534/743; 534/754; 534/755; 534/805; 534/806; 534/807; 534/829; 106/23; 106/400; 106/436; 106/448; 106/493; 106/496; 540/123; 540/124; 540/125; 540/126; 540/127; 540/130; 540/133
[58] Field of Search ............... 534/573 R, 573 L, 754, 534/755, 829, 743; 8/662; 540/123, 124, 130, 133; 552/238

[56] References Cited

U.S. PATENT DOCUMENTS

| 2,022,935 | 12/1935 | Hilger et al. | 534/735 X |
| 3,660,458 | 5/1972 | Trotz et al. | 534/735 X |

FOREIGN PATENT DOCUMENTS 377278  7/1932  United Kingdom ............... 534/735

*Primary Examiner*—Floyd D. Higel
*Attorney, Agent, or Firm*—Sprung, Horn, Kramer & Woods

[57] ABSTRACT

Colorants are obtained by reacting a dyestuff which is free from ionic groups and has $\geq 2$ $NH_2$ groups which are preferably arranged in such a manner that they do not participate in the resonance of the chromophore with such an amount of a (cyclo)aliphatic diisocyante so as to form an adduct that still contains at least two free NCO groups, and subsequently reacting this adduct with a (cyclo)aliphatic diamine, to form an adduct suitable for dyeing and pigmenting macromolecular substances, in particular for coloring PUR-based paints, coatings and laminates.

12 Claims, No Drawings

COLORANTS OBTAINED BY REACTING A NH₂-CONTAINING DYESTUFF WITH A DIISOCYANATE FOLLOWED BY REACTION OF THIS ADDUCT WITH A DIAMINE

The invention relates to colorants, processes for their preparation and their use, in particular for the migration-resistant dyeing of polymers.

For the migration-resistant coloring of polymers, inorganic and organic pigments and also so-called build-in dyestuffs are used. In addition to difficulties during the incorporation of these colorants into the polymeric material, their migration resistance is in many cases unsatisfactory.

Surprisingly, it has now been found that the novel colorants described below can be incorporated into polymers without difficulties, guarantee migration-resistant dyeings and, depending on the area of application, have further advantages compared to known colorants.

The novel colorants can be obtained by reacting a dyestuff which is free from ionic groups and has ≧2 NH₂ groups which are preferably arranged in such a manner that they do not participate in the resonance of the chromophore with such an amount of a (cyclo)aliphatic diisocyanate, in the presence or absence of an organic solvent, with the formation of an adduct such that the reaction product still contains at least two free NCO groups, and subsequently reacting this reaction product with a (cyclo)aliphatic diamine, in the presence or absence of an organic solvent, with the formation of an adduct.

The amino-containing dyestuff can belong to a wide range of dyestuff classes, for example to the triphenylmethane, oxazine, dioxazine, thiazine, nitro, cumarine, quinophthalone, benzodifuranone, perylene, naphthalimide, phthalocyanine, but in particular to the azo or anthraquinone, series.

The following dyestuffs are preferably used.

1. Polyazo dyestuffs of the formula

R—N=N—X—N=N—R₁ in which
R, R₁ designate a substituted phenyl, substituted naphthyl or substituted 5-hydroxypyrazol-4-yl radical and X a bridging link, which dyes contains ≧2 NH₂ groups.

Examples of R and R₁ are:

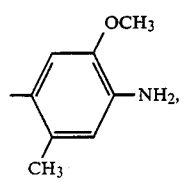
(a)

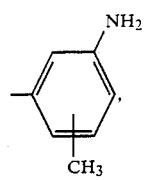
(b)

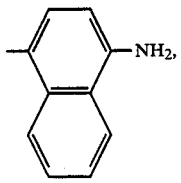
(c)

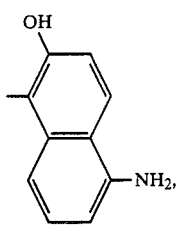
(d)

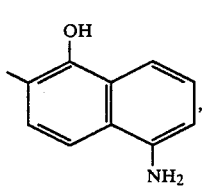
(e)

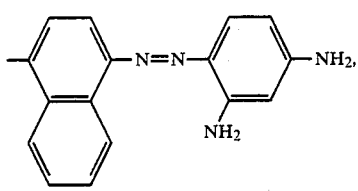
(f)

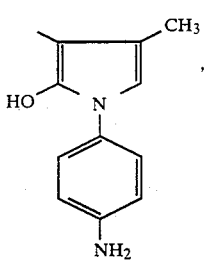
(g)

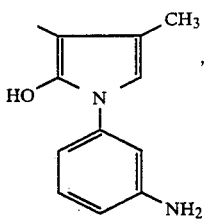
(h)

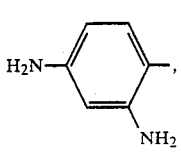
(i)

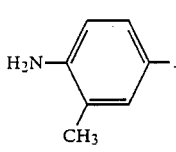
(k)

Examples of X are:

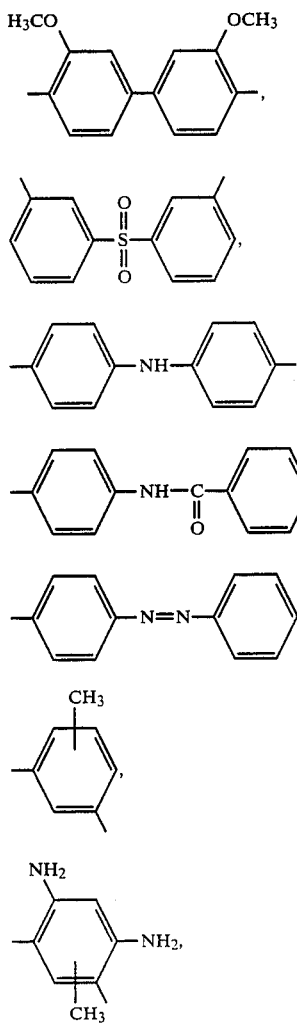

Individual examples of dyestuffs of the formula I are:

(Rg)—(Xe)—(Rg)
(Rg)—(Xd)—(Rg)
(Rc)—(Xc)—(Rc)
(Rc)—(Xe)—(Rc)
(Rd)—(Xa)—(Rd)
(Ra)—(Xa)—(Ra)
(Rc)—(Xa)—(Rc)
(Rf)—(Xe)—(Rf)
(Rf)—(Xa)—(Rf)
(Ri)—(Xf)—(Ri)
(Rg)—(Xa)—(Rg)
(Rh)—(Xa)—(Rh)
(Rg)—(Xc)—(Rg)
(Rg)—(Xh)—(Rg)
(Re)—(Xc)—(Re)
(Rf)—(Xb)—(Rf)
(Ra)—(Xb)—(Ra)
(Rh)—(Xd)—(Rh)
(Rh)—(Xe)—(Rh)
(Rg)—(Xb)—(Rg)
(Rg)—(Xg)—(Rb)
(Rk)—(Xa)—(Rk)

2. Monoazo dyestuffs containing ≧2 NH₂ groups, preferably of the benzene/azo/benzene, benzene/azo/pyrazolone, benzene/azo/acetoacetic arylide or the benzene/azo/naphthalene series, for example:

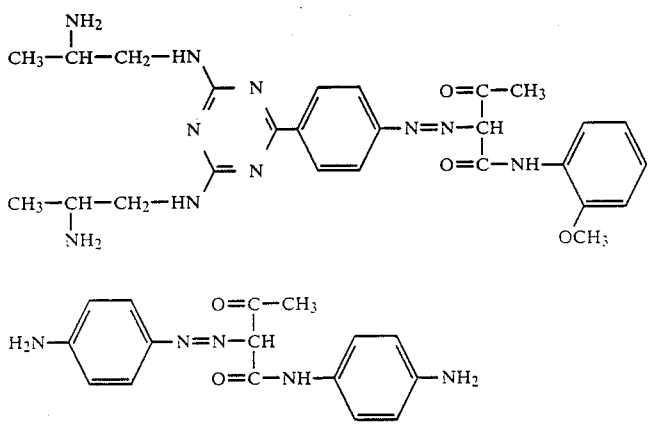

-continued
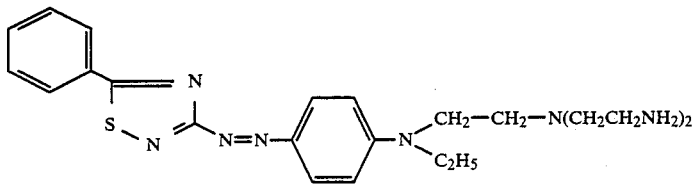
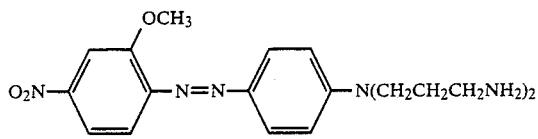
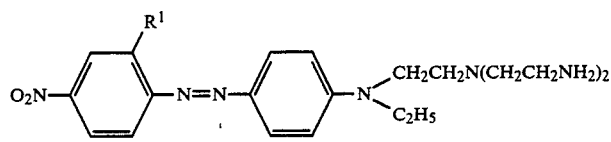
$R^1$ = Cl or —OCH$_3$
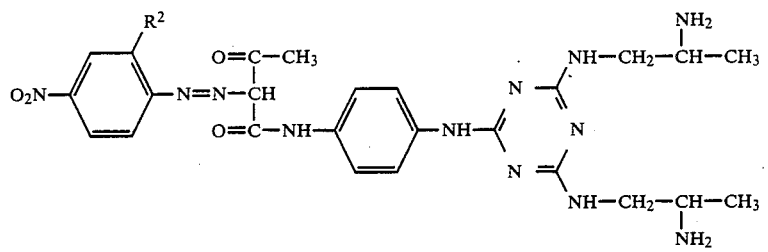
$R^2$ = Cl or —OCH$_3$
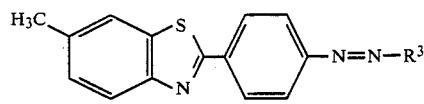
$R^3$ = 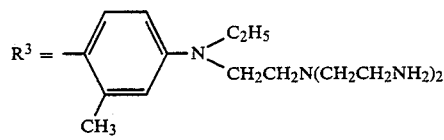
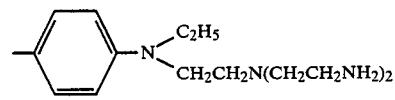
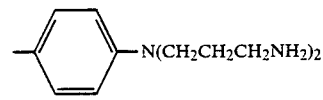
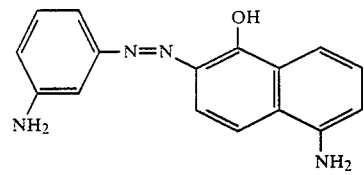

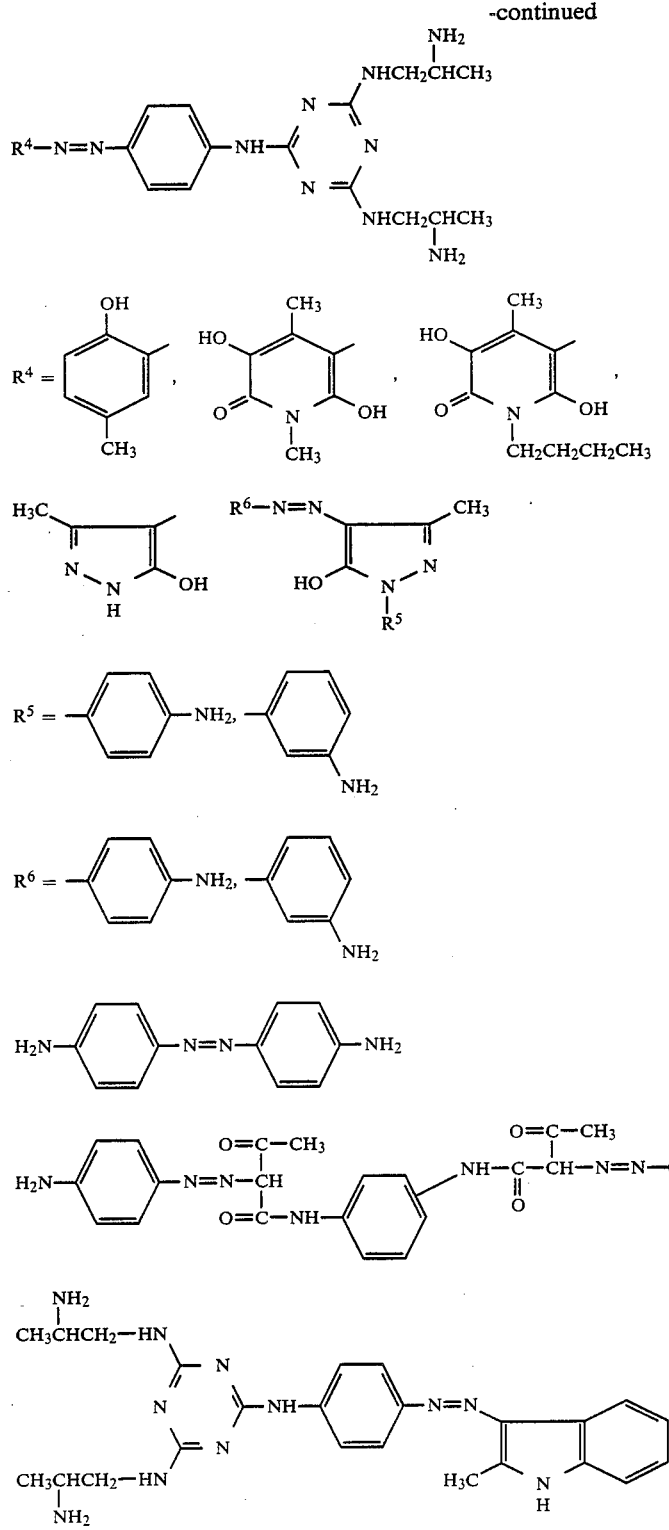
3. Anthraquinone dyestuffs containing ≧2 NH₂ groups, for example:
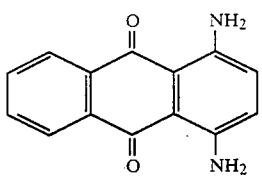

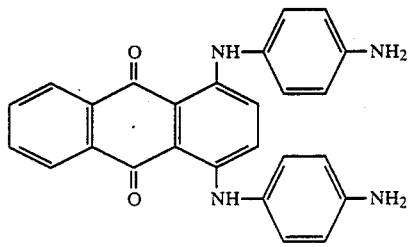

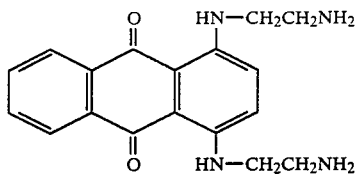

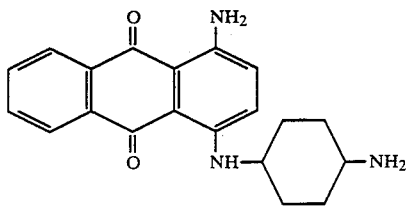

A suitable example of a phthalocyanine dyestuff is $$Cu\text{-}Pc\text{-}(3)(SO_2NH\text{-}C_3H_6\text{-}\underset{\underset{CH_3}{|}}{N}\text{-}C_3H_6\text{-}NH_2)_3$$

Examples of further particularly suitable dyestuffs are also those dyestuffs known from "Color Index" and having the constitution numbers 11245, 11255, 11275, 11285, 11290, 11300, 11310, 11330, 11335, 11365, 21000, 21010, 21020, 21030, 62025, 62030, 63020, 64500, 73315, 73320, 73330.

The dyestuffs to be used according to the invention are known from the literature or can be prepared by analogy with dyestuffs known from the literature.

Suitable (cyclo)aliphatic diisocyanates are preferably: Diisocyanates of the formula $$OCN\text{—}R^7\text{—}NCO$$

in which $R^7$ designates a (cyclo)aliphatic radical having 2 to 24 carbon atoms. Suitable examples are: 3-isocyanatomethyl-3,5,5-trimethylcyclohexyl isocyanate, 1,2-ethylene diisocyanate, 1,2-propylene diisocyanate, 1,2-butylene diisocyanate, 1,3-butylene diisocyanate, tetramethylene diisocyanate, hexamethylene diisocyanate, octamethylene diisocyanate, 2,4,4-trimethylhexamethylene diisocyanate, nonamethylene diisocyanate, 2,2,4-trimethylhexamethylene diisocyanate, decamethylene diisocyanate, 1,12-dodecane diisocyanate, 2.11-dodecane diisocyanate, isocyanates of the formula

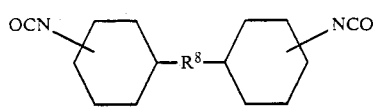

in which $R^8$ designates a $C_1$-$C_4$-alkyl radical, for example:

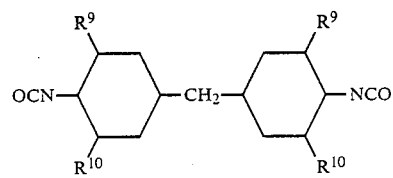

Diisocyanates of the formula

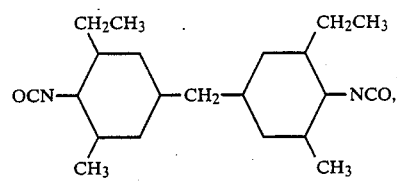

in which $R^9$, $R^{10}$ designate hydrogen, methyl or ethyl, for example the diisocyanate of the formula cyclobutane-1,3-diisocyanate. cyclohexane-1,3-diisocyanate, cyclohexane-1,4-diisocyanate and also the trimerization product from 2 moles of toluylene 2,4-diisocyanate and 1 mole of hexamethylene diisocyanate.

The diisocyanates to be used according to the invention are known from the literature or can be prepared by analogy to processes known from the literature.

Examples of (cyclo)aliphatic diamines are preferably: Diamines of the formula $$H_2N\text{—}R^{11}\text{—}NH_2$$

in which $R^{11}$ designates a (cyclo)aliphatic radical having 2 to 24 carbon atoms.

Preference is given to using those diamines which can be considered as derived by replacing the NCO groups of the diisocyanates listed above by amino groups.

The following are particularly preferred:

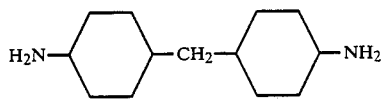

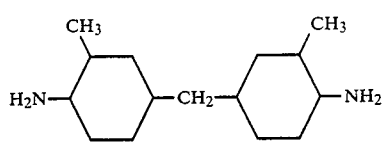

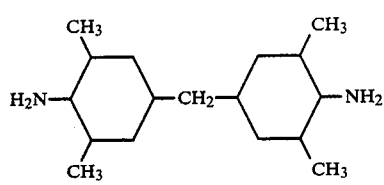

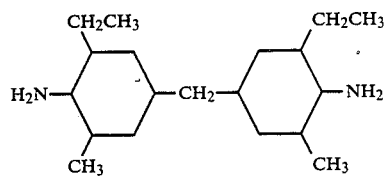

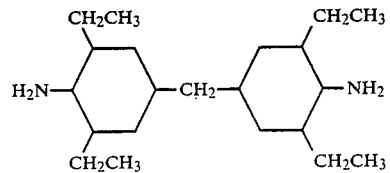

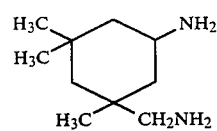

The diamines to be used according to the invention are known from the literature or can be prepared by analogy to processes known from the literature.

Suitable solvents for the addition reaction between the amino-containing dyestuff and the diisocyanate or between the prepolymer containing NCO groups and the diamine are in particular esters, for example ethyl acetate and butyl acetate, and ketones, for example acetone and in particular methyl ethyl ketone.

The reaction product containing NCO groups is preferably prepared by reacting one equivalent of the dyestuff (relative to reactive $NH_2$ groups) with $\geq 2$ equivalents of the diisocyanate.

The reaction of the prepolymeric addition product with the (cyclo)aliphatic diamine can be carried out either with an excess of NCO groups or with an excess of $NH_2$ groups. Preferably, it is carried out at an $NCO:NH_2$ equivalent ratio of 1.2:1–1:1.2, particularly preferably at about 1:1. In the case where the reaction product thus obtained contains unconverted NCO groups, those can be, if desired, deactivated, for example by reaction with monofunctional alcohols, such as methanol, ethanol, i-propanol; in the case where the reaction product obtained in the reaction of the prepolymeric addition product with the diamine contains $NH_2$ groups, those can be, if desired, deactivated, for example by reaction with monofunctional isocyanates, such as methyl isocyanate.

If the prepolymeric addition products still have free NCO groups, those are available for appropriate reactions, for example for (poly)addition of diamines and/or (poly)glycols. If the prepolymeric addition products still have free $NH_2$ groups, those are likewise available for appropriate reactions, for example for addition reactions with compounds containing NCO groups or with epoxides for increasing the chain length or for crosslinking reactions.

The preparation of the reaction product containing NCO groups and its further reaction are preferably carried out in a solvent. Likewise it is preferred to carry it out at room temperature. The colorant obtained is isolated, if desired after removal of the solvent, for example by filtration or evaporation.

In some cases it is recommended to purify the colorant before using it for coloring by a solvent treatment to free it from unreacted or only partially reacted dyestuffs and/or starting materials. This treatment can be carried out, for example, by washing or extraction. Suitable solvents are in particular the ones mentioned above for the preparation of the colorant. In specific cases, the purification can also be carried out using the medium which, by virtue of (partial) dissolution of not completely reacted dyestuff components, has been the cause of the migration tendency in that case. Thus it may be advisable to purify the colorants which are intended for coloring plasticized plastics (PVC) before being used by treatment with a plasticizer, for example dibutyl phthalate. The solvents used in the preparation of the dyestuffs or in their purification, for example by washing or extraction, can, after rectification, be used again for the same purposes so that they are used in a cyclic process, which is in particular preferred for ecological reasons. The purified or unpurified colorants can be used as such or in the form of formulations for coloring and pigmenting a wide range of substrates, in particular organic macromolecular substances.

By virtue of their light and migration resistance, the colorants according to the invention are suitable for a wide range of pigment applications. Thus they can be used for the preparation of pigmented systems having very good fastness properties, such as mixture with other substances, formulations, surface coatings, printing inks, colored paper and colored macromolecular substances. Mixture with other substances can be understood to mean, for example, those with inorganic white pigments such as titanium dioxide (rutile) or with cement. Formulations are, for example, flushed pastes with organic liquids or slurries and fine slurries with water, dispersants and, if appropriate, preservatives. The name surface coatings stands, for example, for physically or oxidatively drying paints, stoving paints, reactive paints, two-component paints, emulsion paints for weather-proof coatings and distempers. Printing inks are understood to mean those for paper, textile and tin plate printing. The macro-molecular substances can be of natural origin, such as rubber, obtained by chemical modification, such as acetyl cellulose, cellulose butyrate or viscous or produced synthetically, such as polymers, polyaddition products and polycondensates. Examples are plastics such as polyvinyl chloride, polyvinyl acetate, polyvinyl propionate, polyolefins, for example polyethylene or polyamides, superpolyamides, polymers and mixed polymers from acrylic esters, methacrylic esters, acrylonitrile, acrylamide, butadiene, styrene and also polyurethanes and polycarbonates. The substances pigmented with the claimed products can be present in any desired form.

The colorants according to the invention are preferably used for coloring PUR-based paints, coatings and laminates of sheetlike structures, for example made of textile, leather, foamed and compact plastics, wood, metal, in particular by the process of PUR reactive coating known from German Offenlegungsschrift No. 2,637,115 (U.S. Pat. No. 4,108,842).

EXAMPLES

In this section of examples, the following dyestuffs appear which, for reasons of clarity, have been abbreviated in the tables by the capital letters indicated:

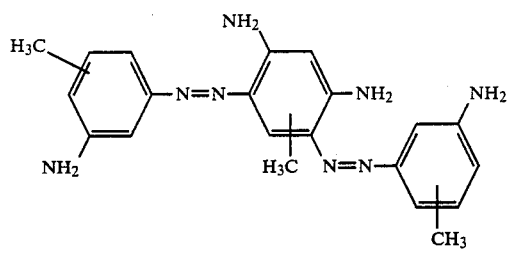

A

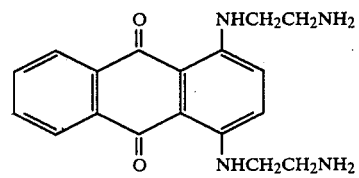

B

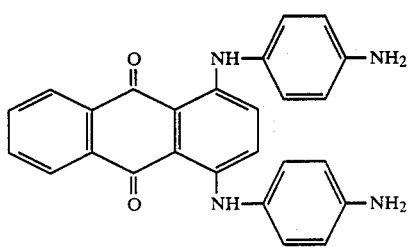

C

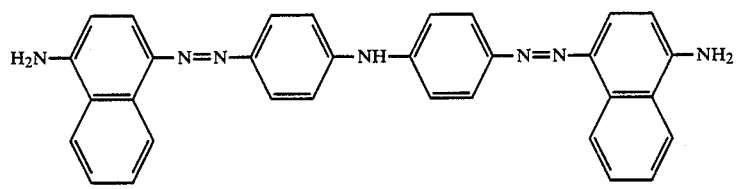

D

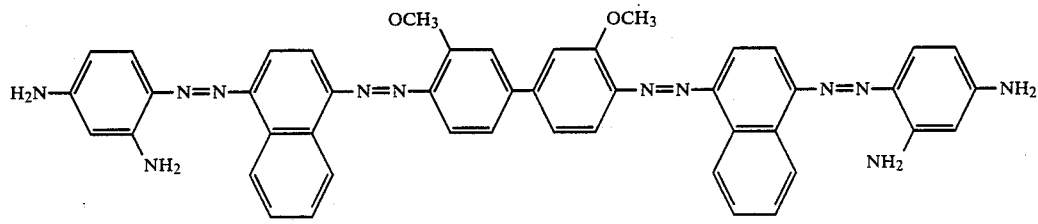

E

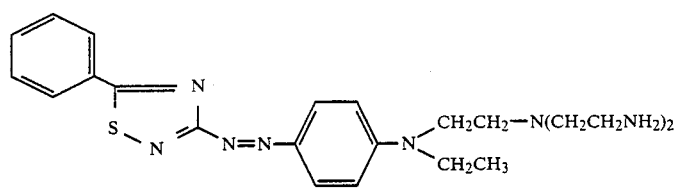

F

-continued
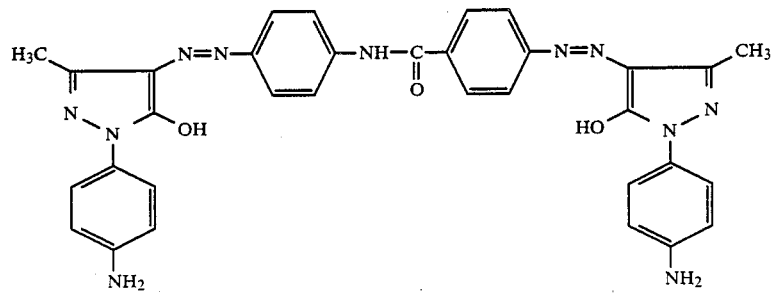
G
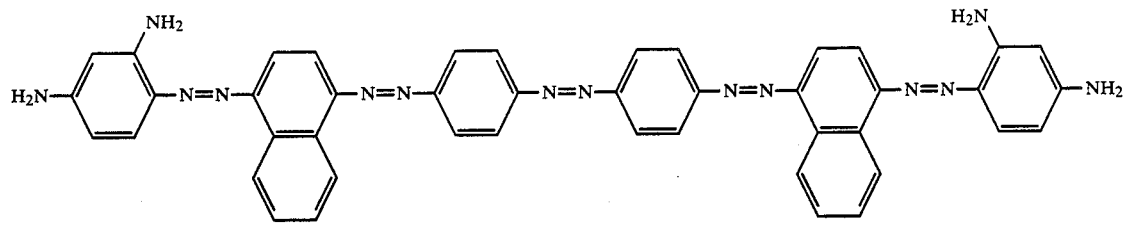
H
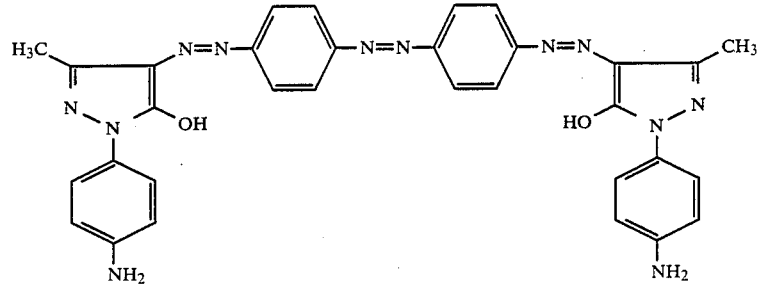
I
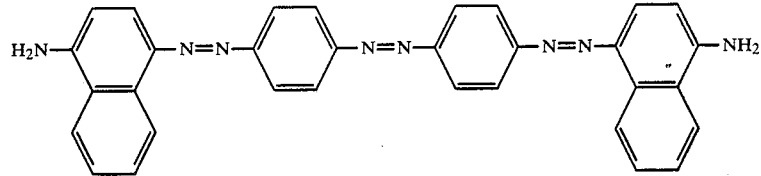
J
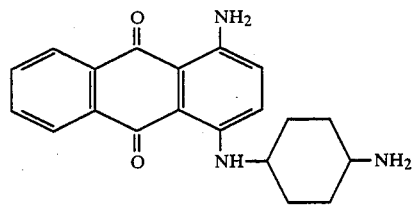
K
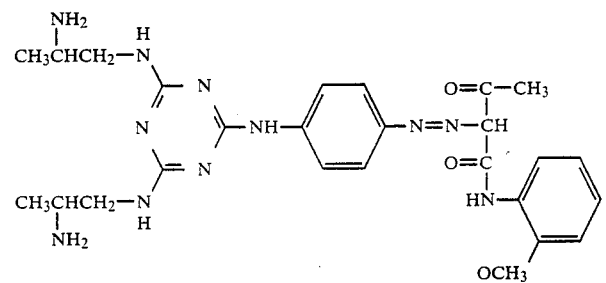
L

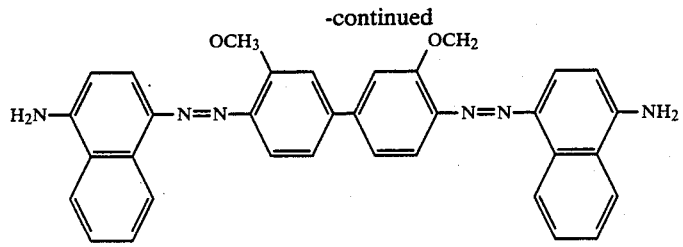
M

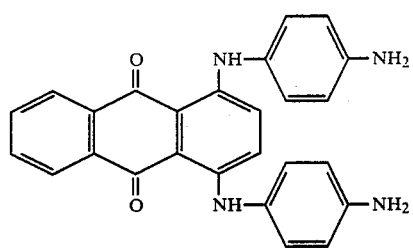
N

EXAMPLE 1

(a) 100 g of 3-isocyanatomethyl-3,5,5-trimethylcyclohexyl isocyanate are dissolved in 300 g of methyl ethyl ketone. 0.45 equivalent of the particular amino dyestuff listed in 1.1–1.11 is added to this solution and the batch is stirred at room temperature for 30 minutes.

(b) Parallel to this mixture, a solution is prepared containing 0.425 equivalent of the diamine listed together with the corresponding dyestuff in 1.1–1.11 in X g of methyl ethyl ketone, in which the diamine is present in the ketimine form.

$$X = 300 - \frac{\text{molecular weight of the diamine}}{2}$$

The solutions obtained according to 1(a) and 1(b) are rapidly combined at room temperature and with vigorous stirring. Immediately after the addition is completed, the batch is poured onto a glass plate or into a tin dish. After the exothermic reaction has ceased, the solidified and then air-dried material is powdered in a morter.

The powder obtained is washed with methyl ethyl ketone and filtered off with suction, until the colorant is free of soluble, that is, unconverted starting dyestuff. The colorants obtained have the hues indicated in the following table.

| Dyestuff | Diamine | | Hue |
|---|---|---|---|
| 1.1 | A | H₂N—(CH₂)₆—NH₂ | red-brown |
| 1.2 | A | H₃C, H₃C, H₃C cyclohexyl with NH₂ and CH₂—NH₂ | red-brown |
| 1.3 | B | " | blue-violet |
| 1.4 | C | " | blue |
| 1.5 | D | H₂N—[CH₂CH₃, CH₃ cyclohexyl]—CH₂—[CH₂CH₃, CH₃ cyclohexyl]—NH₂ | red-brown |
| 1.6 | E | H₂N—[CH₂CH₃, CH₃ cyclohexyl]—CH₂—[CH₂CH₃, CH₃ cyclohexyl]—NH₂ | blue-black |
| 1.7 | F | " | red-violet |
| 1.8 | G | " | yellow |
| 1.9 | A | " | red-brown |
| 1.10 | H | " | violet |
| 1.11 | I | " | yellow-brown |

EXAMPLE 2

(a) 100 g of the diisocyanate of the formula

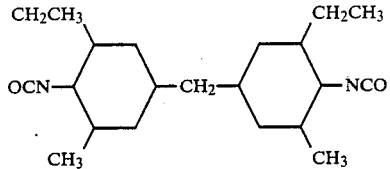

are dissolved in 300 g of methyl ethyl ketone. 0.28 equivalent of the particular amino dye stuff listed in 2.1–2.5 is added to this solution and the batch is stirred at room temperature for 30 minutes.

(b) Parallel to this mixture, a solution is prepared containing 0.28 equivalent of the diamine listed together with the corresponding dyestuff in 2.1–2.5 in methyl ethyl ketone, in which the diamine is present in the ketimine form.

The solutions obtained according to 2(a) and 2(b) are rapidly combined at room temperature and with vigorous stirring. Immediately after the addition is completed, the batch is poured onto a glass plate or into a tin dish. After the exothermic reaction has ceased, the solidified and then air-dried material is powdered in a morter. The powder obtained is washed with methyl ethyl ketone and filtered off with suction, until the colorant is free of soluble, that is, unconverted starting dyestuff. The colorants obtained have the hues indicated in the following table.

| Dyestuff | Diamine | | Hue |
|---|---|---|---|
| 2.1 | E | H₃C, H₃C, H₃C–C–(NCO)(CH₂–NCO) | dark brown |
| 2.2 | J | " | blue-black |
| 2.3 | K | " | blue |
| 2.4 | E | H₂N–[ring(CH₂CH₃)(CH₃)]–CH₂–[ring(CH₂CH₃)(CH₃)]–NH₂ | dark-blue |
| 2.5 | J | " | blue-black |

EXAMPLE 3

Analogously to Examples 1(a) and 2(a), hexamethylene diisocyanate is reacted with the dyestuffs listed in 3.1–3.3 to give the prepolymer containing NCO groups. These are reacted analogously to Examples 1(b) and 2(b) with the diamines 3.1–3.3 listed in the following table to give colorants whose hue is indicated in the table.

| Dyestuff | Diamine | | Hue |
|---|---|---|---|
| 3.1 | L | H₂N-(CH₂)₆-NH₂ | yellow |
| 3.2 | I | H₃C, H₃C, H₃C–C–(NH₂)(CH₂–NH₂) | yellow-brown |
| 3.3 | G | H₂N–⟨⟩–CH₂–⟨⟩–NH₂ | yellow |

EXAMPLE 4

Analogously to Examples 1(a) and 2(a), the diisocyanate of the formula

OCN–⟨⟩–CH₂–⟨⟩–NCO is reacted with the dyestuffs listed in 4.1–4.4 to give the prepolymer containing NCO groups. These are reacted analogously to Examples 1(b) and 2(b) with the diamines 4.1–4.4 listed in the following table to give colorants whose hue is likewise indicated in the table.

| Dyestuff | Diamine | | Hue |
|---|---|---|---|
| 4.1 | E | H₂N-(CH₂)₆-NH₂ | blue-stack |
| 4.2 | M | 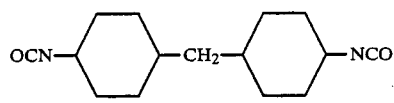 | wine-red |
| 4.3 | N | H₂N–⟨⟩–CH₂–⟨⟩–NH₂ | green |
| 4.4 | H | 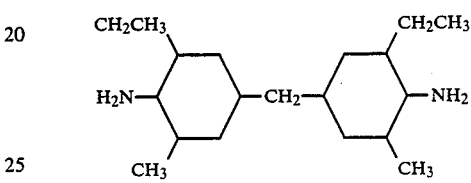 | violet |

EXAMPLE 5

(a) 300 g of 3-isocyanatomethyl-3,5,5-trimethylcyclohexyl isocyanate are dissolved in 800 g of methyl ethyl ketone. 1.2 equivalents of the dyestuffs listed in 5.1–5.9 are added to this solution, and the batch is stirred at room temperature for 30 minutes. 213 g of the diamine of the formula H₂N–[ring(CH₂CH₃)(CH₃)]–CH₂–[ring(CH₂CH₃)(CH₃)]–NH₂ are then added, and the reaction mixture is poured onto a glass plate. After drying, the polymeric product is crushed in a morter and washed three times with methyl ethyl ketone, while it is being filtered off with suction. This gives good yields of colorants having the hues indicated in the following table.

| | Dyestuff | Hue |
|---|---|---|
| 5.1 | A | red–brown |
| 5.2 | B | blue–violet |
| 5.3 | C | blue |
| 5.4 | D | red–brown |
| 5.5 | E | blue–black |
| 5.6 | F | red–violet |
| 5.7 | G | yellow |
| 5.8 | H | violet |
| 5.9 | I | yellow–brown |

(b) A pigment formulation is prepared by grinding 250 g of the colorants obtained according to 5.1–5.9 with the addition of 400 g of the 80 % strength by weight solution in ethyl acetate of a prepolymer which had been prepared by reaction of 0.74 mole of 3-isocyanatomethyl-3,5,5-trimethylcyclohexyl isocyanate, 0.06 mole of the trimerization product from 2 moles of 2,4-toluylene diisocyanate and 1 mole of hexamethylene diisocyanate and 0.36 mole of a hydroxyl polyester from adipic acid, neopentyl glycol and hexane-1,6-diol having a hydroxyl number of 66 and a molecular weight of 1700, and also 350 g of methoxypropyl acetate in a Perl mill.

To prepare a pigmented reactive PUR coating, 100 g of an approximately 80 % strength by weight toluene solution of a prepolymer which had been prepared by reaction of 0.78 mole of a mixture from 2,4 and 2,6-toluylene diisocyanate, 0.07 moles of the trimerization product from 2 moles of 2,4-toluylene diisocyanate and 1 mole of hexamethylene diisocyanate and 0.37 mole of a hydroxyl polyester from adipic acid, neopentyl glycol and hexane-1,6-diol having a hydroxyl number of 66 and a molecular weight of 1700 are reacted with 4.4 g of the amine of the formula

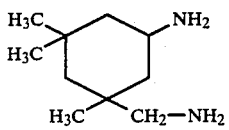

blocked with methyl ethyl ketone, and the reaction product obtained is mixed with 2 g of a polyether-modified polysiloxane as flow-improving agent and 8 g of the colorant obtained according to 5.1–5.9.

The coating of split leather by the reverse process can be carried out, for example, according to Example 1 of German Offenlegungsschrift No. 2,637,115.

We claim:

1. A colorant obtained by reacting a dyestuff which is free from ionic groups and which has $\geq 2$ NH$_2$ groups with such an amount of a aliphatic diisocyante so as to form a reaction product which contains at least two free NCO groups, and subsequently reacting this reaction product with a (cyclo)aliphatic diamine to form an adduct.

2. A colorant according to claim 1, wherein after the preparation of adduct the adduct is freed from unreacted or only partially reacted dyestuffs or starting materials by a solvent treatment.

3. A colorant according to claim 1 wherein the dyestuff is an azo or anthraquinone dyestuff.

4. A colorant according to claim 1 wherein the (cyclo)aliphatic diisocyanate is a (cyclo)aliphatic diisocyanate of the formula

OCN—R$^7$—NCO in which R$^7$ designates a (cyclo)aliphatic radical having 2–24 carbon atoms.

5. A colorant according to claim 1 wherein the (cyclo) aliphatic diisocyanate is selected from the group consisting of

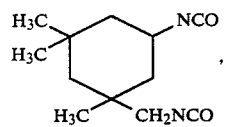

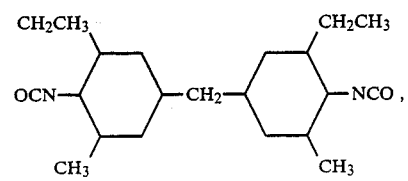

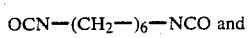

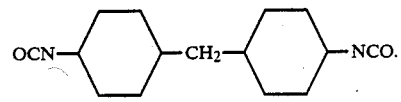

6. A colorant according to claim 1 wherein the (cyclo) aliphatic diamine is a (cyclo) aliphatic diamine of the formula

H$_2$N—R$^{11}$—NH$_2$ in which R$^{11}$ designates a (cyclo)aliphatic radical having 2–24 carbon atoms.

7. A colorant according to claim 1 wherein the (cyclo)aliphatic diamine is selected from the group consisting of

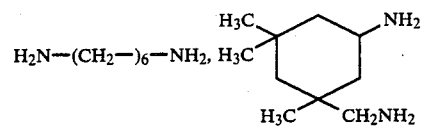

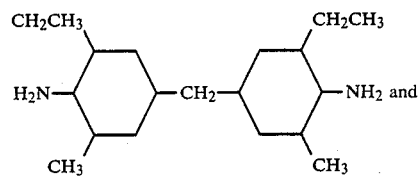

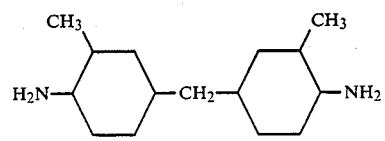

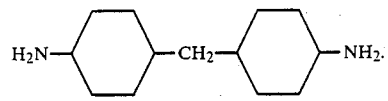

8. A colorant according to claim 1, wherein the reaction between the dyestuff and the diisocyanate is carried out in the presence of a solvent.

9. A colorant according to claim 8, wherein the solvent is an ester or a ketone.

10. A colorant according to claim 1, wherein the reaction is between the reaction product containing free NCO groups and the diamine is carried out in the presence of a solvent.

11. A colorant according to claim 10, wherein the solvent is an ester or a ketone.

12. A colorant according to claim 1, wherein the NH$_2$ groups in the dyestuff which is free from ionic groups and which has $\geq 2$ NH$_2$ groups are arranged in such a manner that the NH$_2$ groups do not participate in the resonance of the chromophore.

* * * * *

UNITED STATES PATENT AND TRADEMARK OFFICE
CERTIFICATE OF CORRECTION

PATENT NO. : 4,978,747

DATED : December 18, 1990

INVENTOR(S) : Weber et al.

It is certified that error appears in the above-identified patent and that said Letters Patent is hereby corrected as shown below:

Col. 21, line 20   After " of a " insert -- (cyclo) --

Signed and Sealed this

Seventeenth Day of November, 1992

Attest:

DOUGLAS B. COMER

*Attesting Officer*  *Acting Commissioner of Patents and Trademarks*